(12) United States Patent
Nemedi

(10) Patent No.: US 9,931,678 B2
(45) Date of Patent: Apr. 3, 2018

(54) PNEUMATIC CHIP COLLECTOR

(71) Applicant: INTER-SOURCE RECOVERY SYSTEMS, Kalamazoo, MI (US)

(72) Inventor: William D. Nemedi, Paw Paw, MI (US)

(73) Assignee: INTER-SOURCE RECOVERY SYSTEMS, Kalamazoo, MI (US)

( * ) Notice: Subject to any disclaimer, the term of this patent is extended or adjusted under 35 U.S.C. 154(b) by 752 days.

(21) Appl. No.: 14/490,018

(22) Filed: Sep. 18, 2014

(65) Prior Publication Data

US 2015/0128998 A1 May 14, 2015

Related U.S. Application Data

(60) Provisional application No. 61/903,049, filed on Nov. 12, 2013.

(51) Int. Cl.
*B08B 5/04* (2006.01)
*B23Q 11/00* (2006.01)

(52) U.S. Cl.
CPC ............ *B08B 5/04* (2013.01); *B23Q 11/0046* (2013.01)

(58) Field of Classification Search
CPC .......... B23Q 11/0046; A47L 9/02; A47L 9/06; A47L 9/242
See application file for complete search history.

(56) References Cited

U.S. PATENT DOCUMENTS

| 1,039,383 | A | * | 9/1912 | Goughnour | A47L 9/02 15/360 |
|---|---|---|---|---|---|
| 4,989,294 | A | * | 2/1991 | Fischer | A47L 9/02 15/393 |
| 6,279,198 | B1 | * | 8/2001 | Martin | A47L 9/06 15/367 |
| 9,516,981 | B1 | * | 12/2016 | Wertz | A47L 9/02 |
| 2010/0319159 | A1 | * | 12/2010 | Gell | A47L 9/0606 15/415.1 |
| 2015/0223656 | A1 | * | 8/2015 | Tucker | A47L 9/068 15/398 |

\* cited by examiner

*Primary Examiner* — Dung Van Nguyen

(74) *Attorney, Agent, or Firm* — Marshall, Gerstein & Borun LLP

(57) ABSTRACT

A pneumatic chip collector includes a free-floating head with a connector configured to be coupled to a pneumatic system. The head has a bottom with at least one slot disposed on the bottom of the head, the at least one slot parallel to the longitudinal axis of the head. The head also has at least one spacer disposed beyond the bottom of the head, the at least one spacer having a outermost surface defining a spacing relative to the bottom of the head with the outermost surface disposed on a surface.

16 Claims, 5 Drawing Sheets

PNEUMATIC CHIP COLLECTOR

BACKGROUND

This patent is directed generally to a chip collector used to collect materials generated during machining operations, and more particularly to a pneumatic chip collector used to collect materials, such as wet chips, generated during machining operations.

In the course of machining operations, scrap materials are generated. These scrap materials may be referred to generally as wet chips or wet chip material, which material includes a solid component and a fluid (lubricant) component. This scrap may be in the form of relatively small wet chips, also referred to as granular wet chips, stringy pieces of wet chips and bales of wet chip material.

Conventionally, wet chip materials are conveyed from one or more machine stations to a centrifugal separator station where the wet chip material is centrifugally separated into dry chips and fluid. This is done so that the dry chips may be reclaimed, and the fluid reclaimed or sent for disposal. Many different conveyors or methods of conveyance are known, including pneumatic transport of the wet chip material from the machine stations to the centrifugal separator.

As set forth in more detail below, the present disclosure sets forth a pneumatic chip collector embodying advantageous alternatives to prior art devices.

SUMMARY

In one aspect, a pneumatic chip collector includes a free-floating head with a connector configured to be coupled to a pneumatic system. The head has a bottom with at least one slot disposed on the bottom of the head, the at least one slot parallel to the longitudinal axis of the head. The head also has at least one spacer disposed beyond the bottom of the head, the at least one spacer having a outermost surface defining a spacing relative to the bottom of the head with the outermost surface disposed on a surface.

In a further aspect, a pneumatic chip collector includes a free-floating, elongated head having a housing with a connector configured to be coupled to a pneumatic system. The elongated head has first and second opposing spacers disposed at opposite ends of the head transverse to a longitudinal axis of the elongated head. The elongate head also has a bottom with at least one slot disposed on the bottom of the elongate head, the at least one slot parallel to the longitudinal axis of the elongated head. The spacers each have a rim disposed beyond the bottom of the elongate head, an outermost edge of the rim defining a spacing relative to the bottom of the elongate head with the outermost edge of the rim disposed on a surface.

In still further aspect, a method of collecting chips from a machining operation includes disposing a free-floating head on a surface. The head has a bottom with at least one slot disposed on the bottom, and at least one spacer disposed beyond the bottom of the elongate head, the at least one spacer having a outermost surface defining a spacing relative to the bottom of the head with the outermost surface disposed on the surface. The method also includes generating a vacuum at the at least one slot, and moving at least one of the free-floating head and the surface relative to the other.

Additional aspects of the disclosure are defined by the claims of this patent.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF VARIOUS EMBODIMENTS

Figure 1:
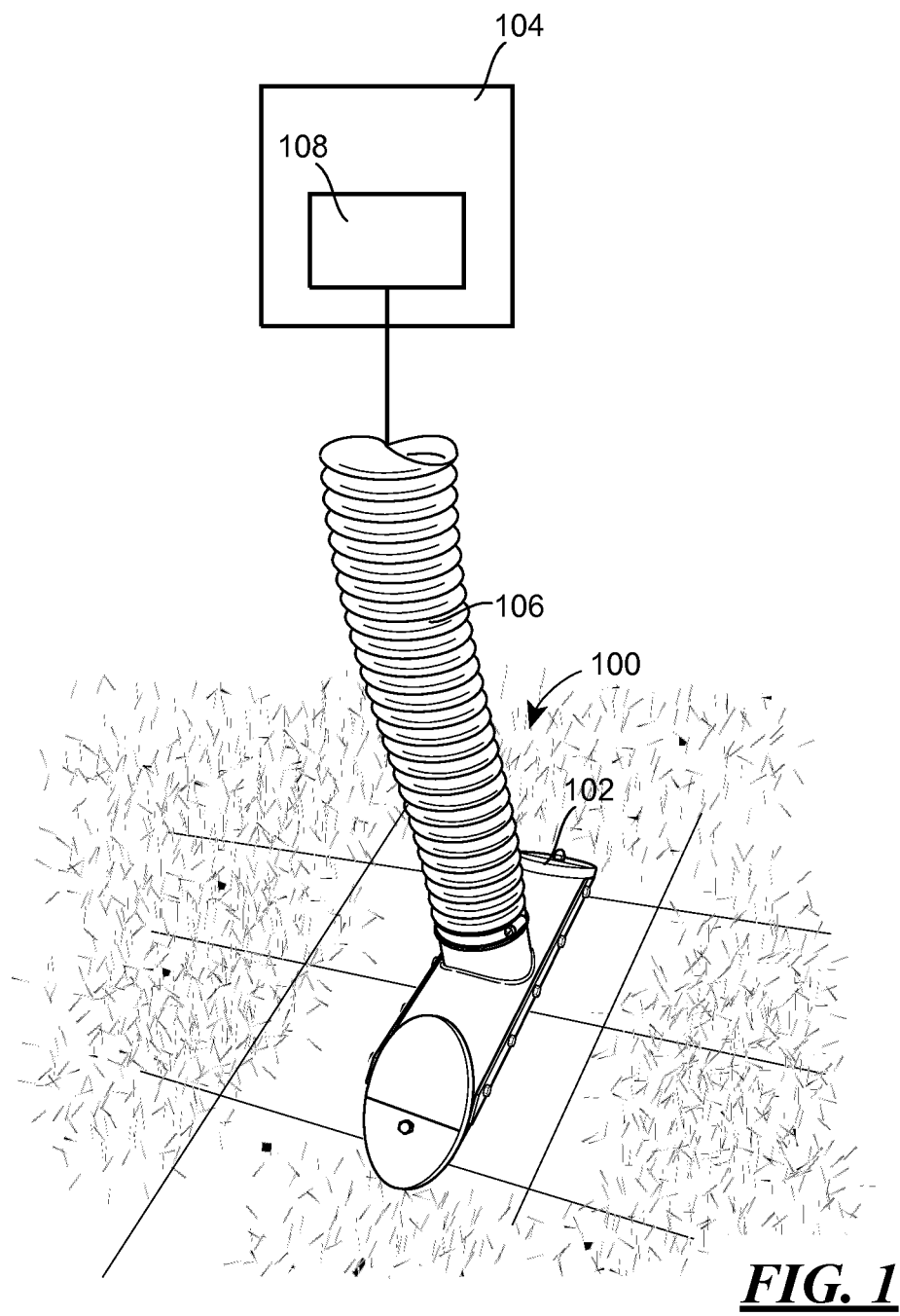
FIG. 1 is a perspective view of a pneumatic chip collector according to the present disclosure.

Referring to FIG. 1, an embodiment of a pneumatic chip collector 100 is illustrated in FIG. 1. The chip collector 100 includes a free-floating head 102, which head 102 is connectable to a pneumatic system 104 by a hose 106, for example. The head 102 is free-floating in that it is not attached to a frame, except that it is tethered from above by the hose 106; that is, the head 102 may be coupled to the hose 106 and still remain free-floating relative to a surface on which the head 102 rests. The pneumatic 104 system may include a fan 108, for example.

In general terms, the head 102 includes a housing 120, a bottom 122 and at least one spacer (or runner) 124. See, e.g., FIG. 2. In particular, the housing 120 has a connector 126 configured to be coupled to a pneumatic system 104, for example by the connector 126 being coupled to the hose 106 that is coupled (directly or indirectly) to the fan 108. The bottom 122 has at least one slot 128 disposed on the bottom 122 of the head 102, the at least one slot 128 parallel to a longitudinal axis 130 of the head 102 as illustrated. The fan 108 may have an operational state in which a vacuum is generated at the at least one slot 128.

The at least one spacer 124 is disposed beyond the bottom 122 of the head 102, the at least one spacer 124 having a outermost surface 132 defining a spacing between the bottom 122 of the head 102 and a surface with the outermost surface 132 of the spacer 124 disposed on the surface, which surface may be defined by a workpiece or a table of a machine tool station on which the workpiece is disposed. More particularly, the outermost surface 132 may be arcuate, at least when initially disposed on the table, and may define a rim disposed beyond the bottom 122 of the head 102. The spacers 124 illustrated in FIGS. 1-3 are disposed at an angle to the longitudinal axis 130 of the head 102 such that the rims 132 of the spacers 124 diverge from each other, although this need not be the case according to all of the embodiments described herein.

Figure 2:
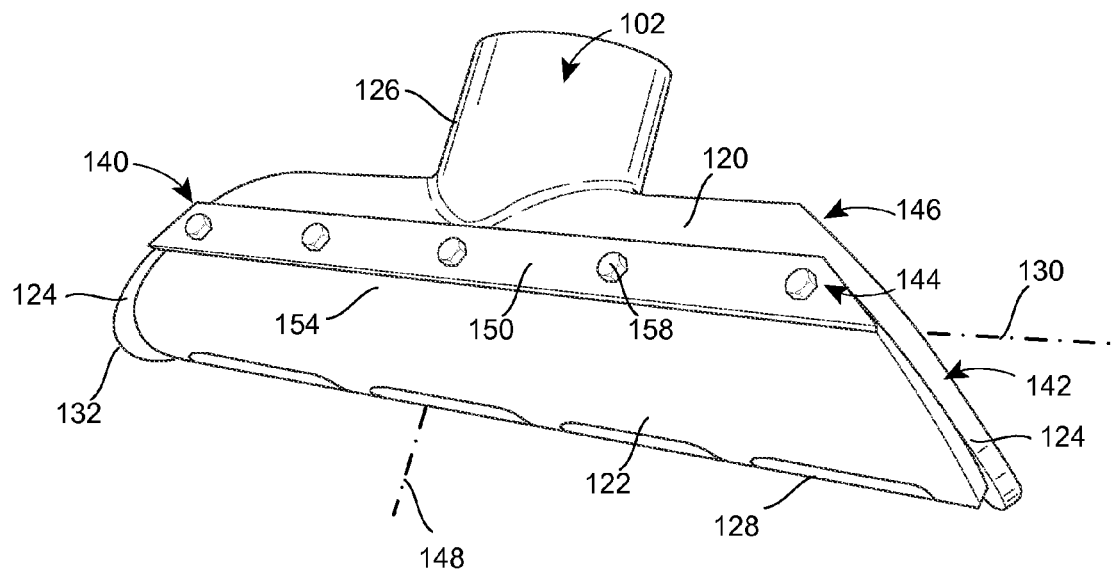
FIG. 2 is as perspective view of an embodiment of a pneumatic chip collector head for use with the collector of FIG. 1.
Figure 3:
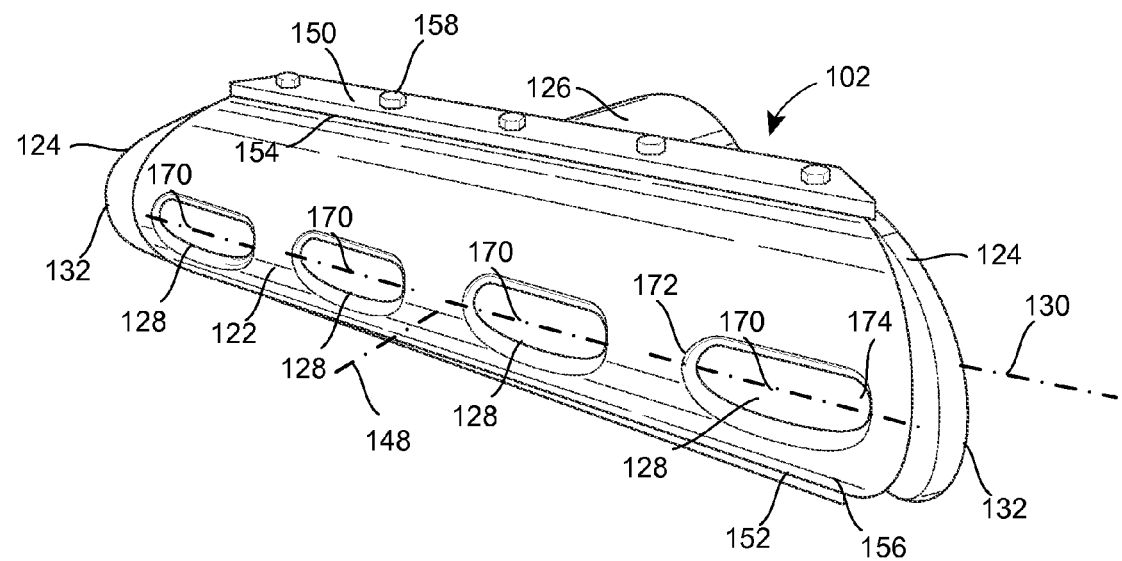
FIG. 3 is a perspective view of the bottom of the pneumatic chip collector head of FIG. 2.
Figure 4:
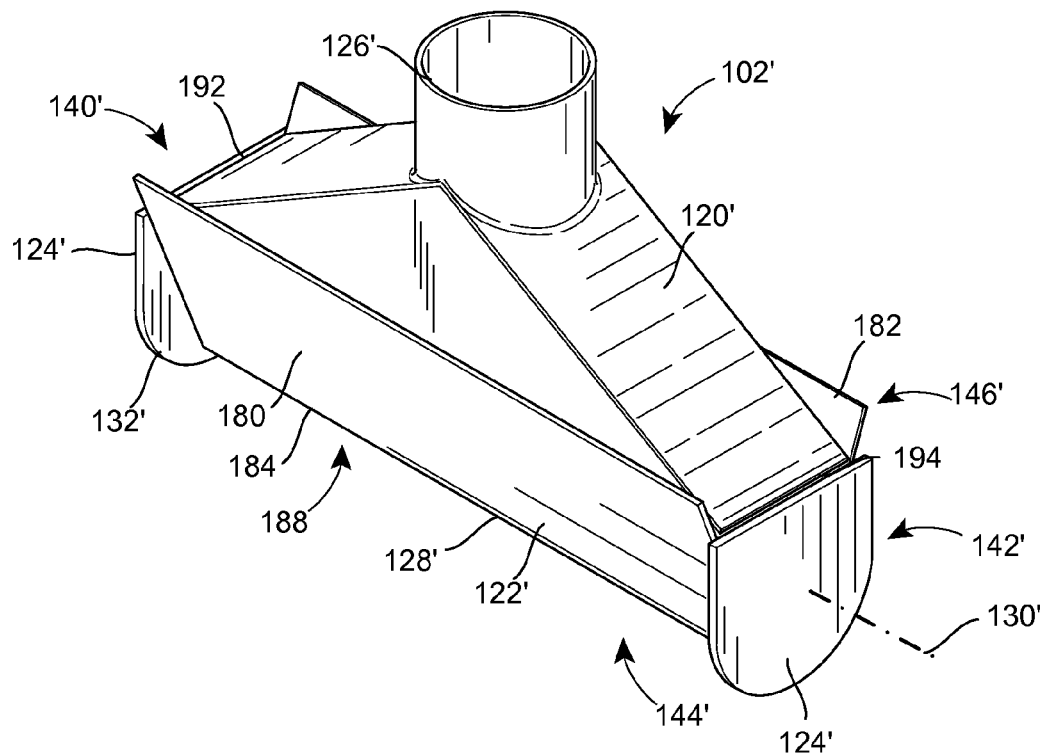
FIG. 4 is a perspective view of another embodiment of a pneumatic chip collector head for use with the collector of FIG. 1.
Figure 5:
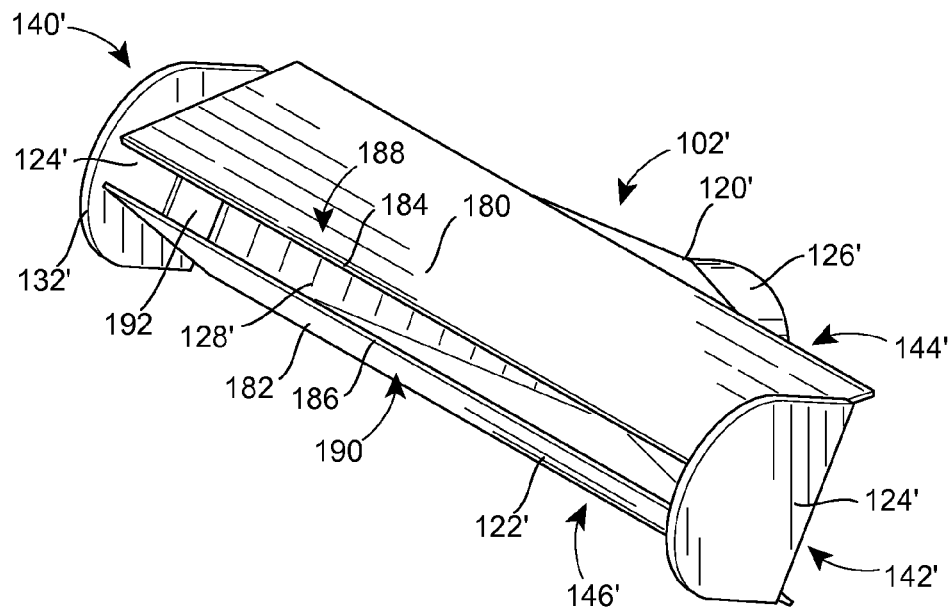
FIG. 5 is a perspective view of the bottom of the pneumatic chip collector head of FIG. 4.
Figure 6:
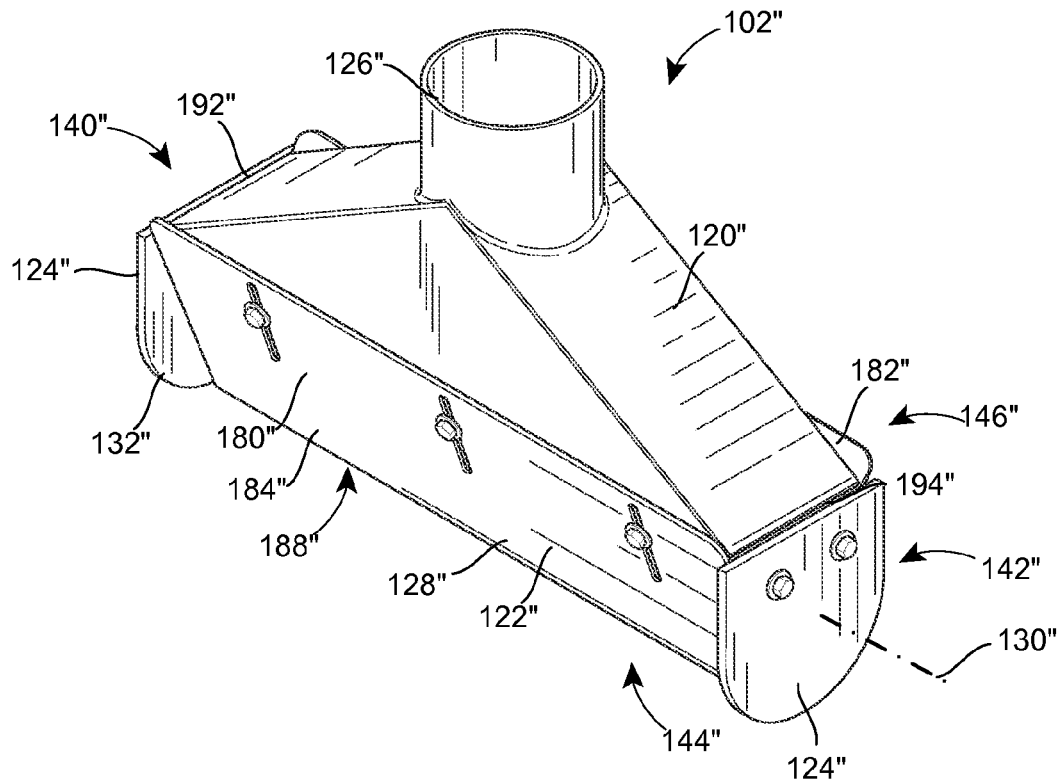
FIG. 6 is a perspective view of a further embodiment of a pneumatic chip collector head for use with the collector of FIG. 1.
Figure 7:
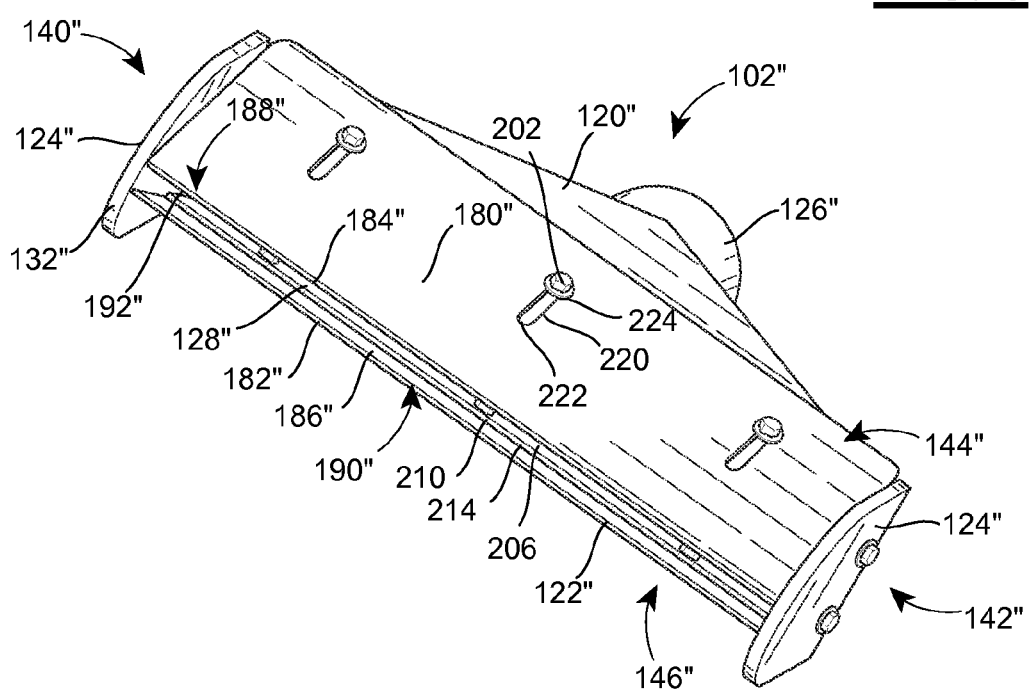
FIG. 7 is a perspective view of the bottom of the pneumatic chip collector head of FIG. 6.
Figure 8:
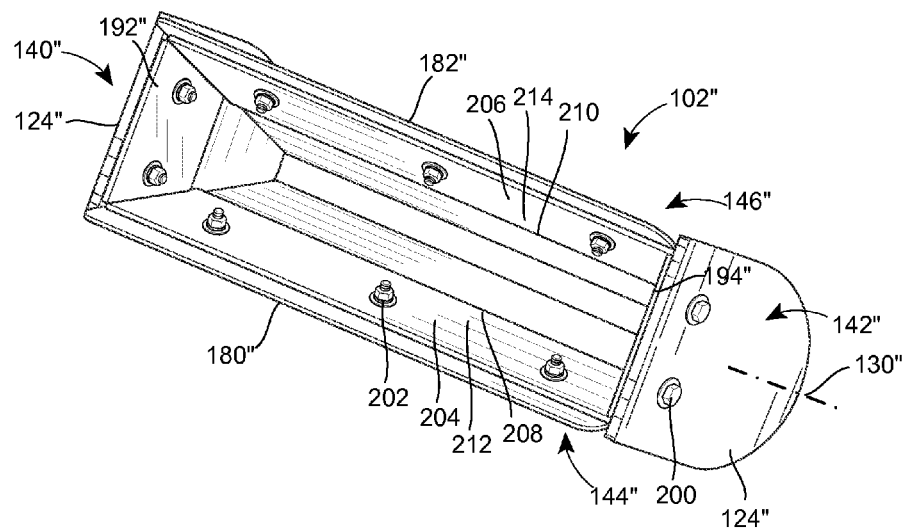
FIG. 8 is a perspective view of the pneumatic chip collector head according to FIG. 6 with a portion of the housing removed to expose internal features of the head.

Three different heads are illustrated in FIGS. 1-8. The three heads have aspects shared in common, which common aspects are described with a common set of reference numerals, the reference numerals for one embodiment being differentiated from the reference numerals for similar aspects of other embodiments through the use of one or more primes. The first head 102 is illustrated in FIGS. 1-3, the second head 102' is illustrated in FIGS. 4-5, and the third head 102" is illustrated in FIGS. 6-8.

With regard first to the embodiment illustrated in FIGS. 1-3, the head 102 is an elongated head with a first end 140 and a second end 142, the longitudinal axis 130 depending between the first and second ends 140, 142. See FIG. 2. The head 102 is elongated in that the dimension along the longitudinal axis 130 is greater than the dimension in a direction transverse to the longitudinal axis (e.g., the head 102 has an appearance that is oval, elliptical or rectangular between first and second ends 140, 142 when viewed from above). The first end 140 may be referred to as the left end, and the second end 142 may be referred to as the right end, although this is done simply for ease of reference and not by way of limitation. The head 102 also has a first side 144 and a second side 146, which sides may be referred to as the front side 144 and the back side 146, again for purposes of explanation and not by way of limitation.

The head 102 is substantially symmetrical about a plane orthogonal to the axis 130 in which an axis 148 is disposed, the axis 148 being disposed equally from either end 140, 142, such that the left end 140 is a minor image of the right end 142. The head 102 is also substantially symmetrical about a plane in which the axes 130, 148 are disposed, such that the front side 144 is a minor image of the back side 146. While the head 102 is symmetrical about these two planes as illustrated, this need not be the case according to all embodiments of the present disclosure. Each of the heads 102, 102' and 102" has substantial symmetry about these planes as illustrated, however.

The connector 126 is attached to the housing 120 opposite the bottom 122, and generally aligned with the axis 148. The connector 126 may be attached integrally, or as one piece, to the housing 120, although this need not be case according to all embodiments. As illustrated, where the housing 120 and the connector 126 are both made of metal, the connector 126 may be welded to the housing 120.

The housing 120 extends from the first end 140 of the housing 120 to the second end 142, and has a first longitudinal edge 150 that is parallel to the longitudinal axis 130 of the head 102. The housing 120 has a second longitudinal edge 152 opposite the longitudinal edge 150, as seen in FIG. 3. The bottom 122 may be attached along longitudinal edges 154, 156 to the first and second longitudinal edges 150, 152 of the housing 120, for example through the use of fasteners 158 as illustrated. The bottom 122 is capped at either end 140, 142 of the head 102 by the runners 124, which also function as end plates according to this embodiment.

As best seen in FIG. 3, the bottom 122 is arcuate in cross-section. Specifically, the bottom may be semi-circular in cross-section. The housing 120 and the bottom 122 may be made of different materials. For example, the housing 120 may be made of metal, while the bottom 122 of the elongate head 102 may be made of ultra high-molecular-weight (UHMW) polyethylene.

Also according to the embodiment illustrated in FIGS. 1-3, the at least one slot 128 comprises a plurality of elongate slots 128 disposed on the bottom 122 of the elongate head 102, each of the plurality of elongate slots 128 having a longitudinal axis 170 between opposing ends 172, 174, the longitudinal axes 170 of the plurality of elongate slots 128 parallel to the longitudinal axis 130 of the elongate head 102. The longitudinal axes 170 of the plurality of elongate slots 120 may lie along a common line or axis (i.e., may be collinear), as illustrated.

In operation, the head 102 is disposed on a surface of a table of a machine tool, for example. In particular, the surfaces 132 of the spacers 124 are disposed on the surface of the table, with the head 102 depending downward from the hose 106 connected to the connector 126. The motion of the head 102 is not constrained except through the connection between the hose 106 and the connector 126 and the abutting surfaces 132 of the spacers 124 and the surface of the table. Consequently, as the table moves under the head 102 (or as the head is moved over the table by the movement of the hose 106), the head 102 is permitted to adjust its orientation (front or back) relative to the table as a consequence of the curved surfaces 132.

Over time, the movement of the head 102 relative to the table may cause the spacers 124, and in particular the surfaces 132 of the spacers 124 to wear. Because the head 102 may rotate to the front or the back, the curved profile of the surfaces 132 of the spacers 124 may become progressively more tapered, until the profile appears more pointed in shape, like an arrowhead. At this point, the spacers may be removed and replaced.

A second embodiment of the head 102' according to the present disclosure is illustrated in FIGS. 4 and 5. Like the head 102 of FIGS. 1-3, the head 102' has a housing 120', bottom 122', spacers 124' and a connector 126'. At least one slot 128' is formed in the bottom 122', and the slot 128' is spaced from the surface of a table on which the head 102' is disposed by the outermost surfaces 132' of the spacers 124'.

Unlike the head 102, the elongate head 102' comprises first and second opposing side plates 180, 182 disposed across the longitudinal axis 130' from each other. That is, the side plates 180, 182 are on opposite sides of the longitudinal axis 130'. The first and second opposing side plates 180, 182 each have a lower edge 184, 186 disposed across the longitudinal axis 130' from each other at a lower end 188, 190 of the first and second opposing side plates 180, 182. The lower edges 184, 186 of the opposing side plates 180, 182 define the at least one slot 128' on the bottom 122' of the head 102'. As is also illustrated, the first and second opposing side plates 180, 182 are disposed at an angle to the longitudinal axis 130' of the elongate head 102' such that lower ends 188, 190 of the first and second opposing side plates 180, 182 converge toward each other.

Also unlike the head 102, the spacers (or runners) 124' may not entirely define the ends of the slot 128'. Instead, the elongated head 102' may include first and second opposing end plates 192, 194 disposed at opposite ends 140', 142' of the head 102' transverse to the longitudinal axis 130' of the elongated head 102'. As illustrated, the end plates 192, 194 may be orthogonal to the axis 130'. The spacers 124' may be attached to the end plates 192, 194, which may facilitate the removal and replacement of the spacers 124'.

A still further embodiment of the head 102" is illustrated in FIGS. 6-8. While the head 102" has features in common with the head 102 and the head 102', the head 102" is most like the head 102'. That is, both the head 102' and the head 102" have a single slot 128', 128" disposed on the bottom 122', 122" of the head 102', 102". However, the head 102" has additional features that permit the head 102" to accommodate a greater number of operational conditions.

The head 102" has a housing 120", bottom 122", spacers 124" and a connector 126". At least one slot 128" is formed in the bottom 122", and the slot 128" is spaced from the surface of a table on which the head 102" is disposed by the outermost surfaces 132" of the spacers 124"

The head 102" also includes side plates 180", 182" with lower edges 184", 186" at lower ends 188", 190", the side plates 180", 182" converging such that edges 184", 186" define in part the slot 128". The spacers 124" are disposed at either end 140", 142" and also define in part the slot 128".

Both the spacers 124" and the side plates 180", 182" are removably or moveably secured to the remainder of the head 102" to permit adjustment or replacement. In the case of the spacers 124", removably securing the spacers 124" may facilitate replacement that may be desirable to maintain a constant spacing between the bottom 122" of the head 102" and the surface on which the head 102" is disposed. In the case of the side plates 180", 182", moveably securing the side plates 180", 182" may facilitate adjustment that may be desirable to vary the distance between the edges 184", 186" so as to vary the width of the slot 128" (i.e., the distance across the longitudinal dimension of the slot 128"). The moveable attachment of the side plates 180", 182" may also facilitate their removal and replacement as well.

To this end, the head 102" includes end plates 192", 194" disposed at the left and right ends 140", 142" of the head 102" as best seen in FIG. 8. The spacers 124" are removably secured to the end plates 192", 194" through the use of fasteners 200, for example. The fasteners 200 may be disposed through openings in the spacers 124" and the end plates 192", 194", and tightened to secure the spacers 124" to the end plates 192", 194". Untightening the fasteners 200 would permit the spacers 124" to be removed from the end plates 192", 194", and replaced with other spacers 124".

Furthermore, the first and second opposing spacers 124" may be moveably secured to the housing 120" to vary the spacing relative to the bottom 122" of the elongate head 102" with the outermost surface 132" disposed on a surface of a workpiece or table. To this end, either the openings in the spacers 124" or the openings in the end plates 192", 194" may be elongated openings, such that with the fasteners 200 disposed through the openings the spacers 124" would have a range of positions relative to the end plates 192", 194" as a consequence.

In fact, according to the embodiment illustrated in FIGS. 6-8, the first and second opposing side plates 180", 182" are moveably secured to the housing 120" to vary a distance between the lower edges 184", 186" of the first and second opposing side plates 180", 182" transverse to the longitudinal axis 130" of the elongate head 102". In particular, the first and second opposing side plates 180", 182" may be each moveably secured to the housing 120" with fasteners 202, the fasteners 202 attached to (or through) the housing 120" to fix the distance between the lower edges 184", 186" of the first and second opposing side plates 180", 182".

To this end, first and second housing side plates 204, 206 are disposed at either side 144", 146" of the housing 120". See, e.g., FIGS. 7 and 8, but a portion of the housing 120" has been removed in FIG. 8 to better expose the plates 204, 206. The first and second housing side plates 204, 206 are disposed across the longitudinal axis 130" from each other as was the case with the plates 180", 182". The first and second housing side plates 204, 206 each have a lower edge 208, 210 disposed across the longitudinal axis 130" from each other at a lower end 212, 214 of the first and second housing side plates 204, 206. As is also illustrated, the first and second opposing side plates 204, 206 are disposed at an angle to the longitudinal axis 130" of the elongate head 102" such that lower ends 212, 214 of the first and second housing side plates 204, 206 converge toward each other.

The fasteners 202 are disposed through openings in the side plates 180", 182" and the housing side plates 204, 206. In particular, the housing side plates 204, 206 have circular openings that accommodate the bolt of a nut-bolt pair. The side plates 180", 182" have one or more elongate slots 220 formed therethrough. The slots 220 also accommodate the bolt of a nut-bolt pair, but have first and second ends 222, 224 that are spaced from each other, such that the bolt may move along the slot 220 between the ends 222, 224 when the nut is not secured tightly to the bolt; for example, the fastener 202 is illustrated as disposed in the second end 224 of the slot 220 in FIG. 7. With the nut-bolt pair securely tightened, relative motion between the plates 180", 204 and 182", 206 is limited or prevented.

As to operation of a collector as described above, a method of collecting chips from a machining operation may include disposing a free-floating head on a surface, for example of a workpiece or a table of a machine tool station. The head has a bottom with at least one slot disposed on the bottom, and at least one spacer disposed beyond the bottom of the elongate head, the at least one spacer having a outermost surface defining a spacing relative to the bottom of the head with the outermost surface disposed on the surface. The method further includes the steps of generating a vacuum at the at least one slot, and moving at least one of the free-floating head and the surface relative to the other.

In addition, the method may include adjusting the spacing relative to the bottom of the head with the outermost surface disposed on the surface. Further, the method may include adjusting a width of the at least one slot disposed on the bottom of the head. As noted above, the free-floating head may be suspended from the end of a hose connected to a pneumatic system.

Although the preceding text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

What is claimed is:

1. A pneumatic chip collector, comprising:
    a free-floating head with a connector configured to be coupled to a pneumatic system,
    the head having a bottom with at least one slot disposed on the bottom of the head, the at least one slot parallel to the longitudinal axis of the head,
    the head having first and second opposing side plates that are disposed across the longitudinal axis from each other such that lower edges of the first and second opposing side plates converge toward each other forming the at least one slot, and
    the head having at least one spacer disposed beyond the bottom of the head, the at least one spacer having a outermost surface defining a spacing relative to the bottom of the head with the outermost surface disposed on a surface.

2. The pneumatic chip collector according to claim 1, wherein the first and second opposing side plates are moveably secured to the housing to vary a distance between the lower edges of the first and second opposing side plates transverse to the longitudinal axis of the head.

3. The pneumatic chip collector according to claim 2, wherein the first and second opposing side plates are secured with a fastener to fix the distance between the lower edges of the first and second opposing side plates.

4. A pneumatic chip collector, comprising:
    a free-floating, elongated head having a housing with a connector configured to be coupled to a pneumatic system,
    the elongated head having first and second opposing spacers disposed at opposite ends of the head transverse to a longitudinal axis of the elongated head,
    the elongate head having a bottom with at least one slot disposed on the bottom of the elongate head, the at least one slot parallel to the longitudinal axis of the elongated head, and
    the elongate head having first and second opposing side plates that are disposed across the longitudinal axis from each other such that lower edges of the first and second opposing side plates converge toward each other forming the at least one slot,
    the spacers having a rim disposed beyond the bottom of the elongate head, an outermost edge of the rim defining a spacing relative to the bottom of the elongate head with the outermost edge of the rim disposed on a surface.

5. The pneumatic chip collector according to claim 4, wherein the rims of the first and second spacers are arcuate.

6. The pneumatic chip collector according to claim 4, wherein the first and second opposing side plates are moveably secured to the housing to vary a distance between the lower edges of the first and second opposing side plates transverse to the longitudinal axis of the elongate head.

7. The pneumatic chip collector according to claim 6, wherein the first and second opposing side plates are secured with a fastener to fix the distance between the lower edges of the first and second opposing side plates.

8. The pneumatic chip collector according to claim 4, wherein the first and second opposing spacers are moveably secured to the housing to vary the spacing relative to the bottom of the elongate head with the outermost edge of the rim disposed on a surface.

9. The pneumatic chip collector according to claim 8, wherein the first and second opposing spacers are secured with a fastener to fix the spacing relative to the bottom of the elongate head with the outermost edge of the rim disposed on a surface.

10. The pneumatic chip collector according to claim 4, wherein the housing and the bottom are made of different materials.

11. The pneumatic chip collector according to claim 10, wherein the housing of the elongate head is made of metal and the bottom of the elongate head is made of ultra high-molecular-weight polyethylene.

12. The pneumatic chip collector according to claim 4, wherein the connector is coupled to a hose that is coupled to a fan, the fan having an operational state in which a vacuum is generated at the at least one slot.

13. A method of collecting chips from a machining operation, the method comprising:
    disposing a free-floating head on a surface, the free-floating head having a connector configured to be coupled to a pneumatic system,
    the head having a bottom with at least one slot disposed on the bottom, the at least one slot parallel to a longitudinal axis of the head, and at least one spacer disposed beyond the bottom of the elongate head, the at least one spacer having a outermost surface defining a spacing relative to the bottom of the head with the outermost surface disposed on the surface, and the head having first and second opposing side plates that are disposed across the longitudinal axis from each other such that lower edges of the first and second opposing side plates converge toward each other forming the at least one slot,
    generating a vacuum at the at least one slot, and
    moving at least one of the free-floating head and the surface relative to the other.

14. The method according to claim 13, further comprising:
    adjusting the spacing relative to the bottom of the head with the outermost surface disposed on the surface.

15. The method according to claim 13, further comprising:
    adjusting a width of the at least one slot disposed on the bottom of the head.

16. The method according to claim 13, further comprising:
    suspending the free-floating head from the end of a hose connected to a pneumatic system.

* * * * *